July 14, 1942.  H. DIXON  2,289,829
FISHING TOOL
Filed March 14, 1942
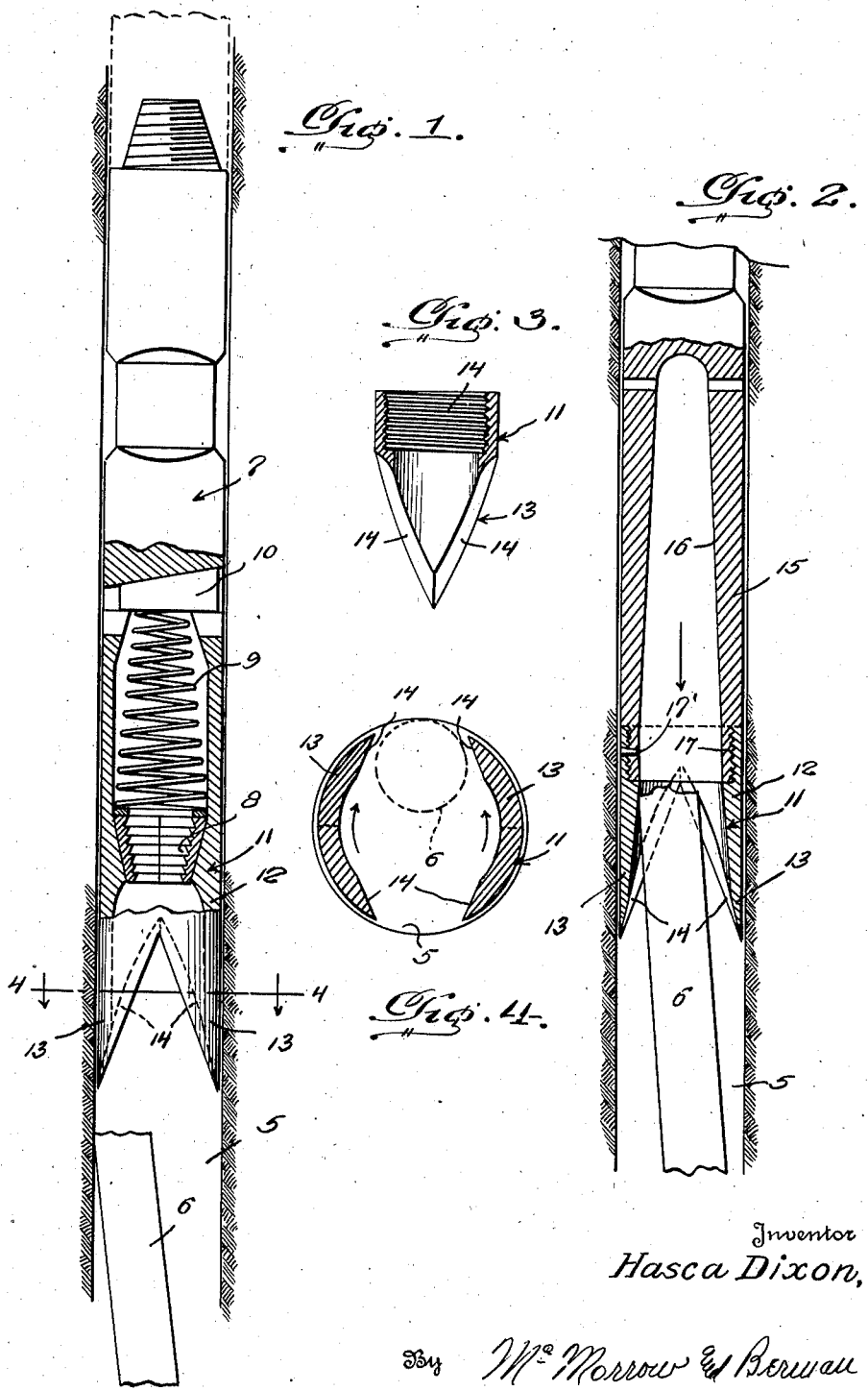
Inventor
Hasca Dixon,
By McMorrow & Berman
Attorneys Patented July 14, 1942

2,289,829

UNITED STATES PATENT OFFICE 2,289,829

FISHING TOOL

Hasca Dixon, Paintsville, Ky.

Application March 14, 1942, Serial No. 434,745

1 Claim. (Cl. 294—86)

This invention relates to fishing tools for removing lost objects, tools and the like from wells which are under construction or being drilled to greater depth and more particularly to a shoe for a tool of the character specified and which may form a part of said tool or may be attachable thereto for the purpose of guiding into the tool a lost drill, a broken drill rod or any other lost object in the well which may have assumed a position of leaning against a wall of the well while resting on the bottom of said well, so that time and labor will be reduced to a minimum in bringing the tool in gripping relation to the lost object.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation partly in section illustrating a fishing tool equipped with a shoe constructed in accordance with my invention and showing the tool within a well prior to bringing the tool into engagement with a lost object.

Figure 2 is a view similar to Figure 1 showing the application of the present invention to another type of fishing tool from that shown in Figure 1.

Figure 3 is a vertical sectional view illustrating one of the tines or guides of the shoe.

Figure 4 is a sectional view taken on the line 4—4 of Figure 1.

Referring in detail to the drawing, the numeral 5 indicates a well, 6 a lost object in said well and 7 a fishing tool of the type employing spring influenced gripping jaws 8 arranged internally thereof. The spring for influencing the jaws 8 is indicated by the character 9 and may have the tension thereof varied by a wedge 10.

A fishing tool of this character is extremely inefficient in that it is practically impossible to bring a lost object into engagement with the gripping jaws when the tool is lowered and when said object is occupying an upright tilted position. Much time and labor is lost in attempting to remove an object thus positioned with a tool of the kind described and shown. In order that the tool may be made efficient, the present invention is formed integrally with its lower end. The present invention is indicated in entirety by the character 11 and is in the form of a shoe including a body 12 provided with V-shaped cut-outs forming substantially V-shaped tines or prongs 13, each arcuately curved and provided with beveled faces 14 leading inwardly from the free edges of said tines or prongs.

The tool equipped with a shoe 11 of the character described will readily position the lost object 6 in an upright position as the tool is lowered into engagement with said object, so that on further lowering of the tool 7 the object 6 will be guided into engagement with the gripping jaws 8 and become tightly gripped thereby so that on raising of the tool 7 from the well the lost object 6 will be removed from the well along with the tool.

By reference to Figure 1 it will be seen that the pointed ends of the tines 13 will occupy positions in close proximity to the walls of the well as the tool 7 is lowered so that said pointed ends may move between the lost object 6 and the wall of the well and bring about righting of the lost object as the tool is lowered and further guide the object into engagement with the gripping jaws to be gripped thereby.

While the shoe has been shown and described in connection with Figure 1 as forming an integral part of the tool 7, the body 11 may be internally screw threaded, as shown at 14, so that said body may be threaded onto the lower end of the fishing tool as shown in Figure 2. This figure also shows another type of fishing tool from that shown in Figure 1 and is indicated in entirety by the character 15.

The tool 15 is of the frictional gripping type and includes a tapered bore 16 opening outwardly through its lower screw threaded end 17. The screw threaded end 17 of the tool 15 has the body 11 of the shoe threaded thereon. The shoe thus applied to the tool 15 will efficiently bring a lost object from an inclined position into a perpendicular position and guide the same into the bore 16 so that as the tool 15 is lowered further with relation to the lost object, the latter becomes tightly wedged in the bore 16 whence said lost object may be removed from the well on the removal of the tool 15 from said well.

To assure against accidental unthreading of the body 11 from the tool 15, said tool and body may be provided with aligned openings in which a wedge shaped pin 17' may be fitted. By the use of the present invention in the manner described, will obviate the necessity of the common practice of using a wall hook to straighten up the lost object when attempting to adapt the tool thereto.

While I have shown and described the preferred embodiment of my invention, it will be understood that minor changes in construction, combination and arrangement of parts may be made without departing from the spirit and scope of the invention as claimed.

Having thus described my invention, what I claim is:

In a shoe for a fishing tool, a hollow cylindrical body arranged on the receiving end of a fishing tool and providing a continuation thereof with an exterior diameter equal to the exterior diameter of the tool for eliminating exterior surfaces of different diameters and the possibility of catching on objects when lowered in a well, said body having V shaped cutouts providing substantially V shaped prongs each being arcuately curved transversely thereof and provided with tapered faces extending from the edges thereof inwardly of said prongs, said prongs lying in the plane of the exterior walls of the tool and acting to guide into the body and through the latter into the fishing tool an object occupying a tilted position within a well.

HASCA DIXON.